US005772306A

United States Patent [19]
Okuchi

[11] Patent Number: 5,772,306
[45] Date of Patent: Jun. 30, 1998

[54] ILLUMINATING DEVICE WITH A LIGHT DISTRIBUTING LENS

[75] Inventor: Hiroaki Okuchi, Anjo, Japan

[73] Assignee: Nippondenso Co., Ltd., Kariya, Japan

[21] Appl. No.: 660,740

[22] Filed: Jun. 11, 1996

[30] Foreign Application Priority Data

Jun. 12, 1995 [JP] Japan .................................... 7-144997

[51] Int. Cl.[6] ....................................................... B60Q 1/02

[52] U.S. Cl. .............................. 362/61; 362/32; 362/268; 362/332; 362/336

[58] Field of Search ................................ 362/61, 80, 331, 362/332, 32, 268, 311, 326, 333–340

[56] References Cited

U.S. PATENT DOCUMENTS

| | | | |
|---|---|---|---|
| 4,073,578 | 2/1978 | Welsh | 351/167 |
| 4,195,919 | 4/1980 | Shelton | 351/167 |
| 4,572,620 | 2/1986 | Kikuchi | 359/688 |
| 4,583,153 | 4/1986 | Tsuyama | 362/299 |
| 5,245,366 | 9/1993 | Svochak | 351/161 |
| 5,436,806 | 7/1995 | Kato | 362/32 |
| 5,450,243 | 9/1995 | Nishioka | 359/710 |

FOREIGN PATENT DOCUMENTS

| | | |
|---|---|---|
| 0 623 789 | 11/1994 | European Pat. Off. . |
| 4-10163 | 2/1992 | Japan . |
| 7-21801 | 1/1995 | Japan . |

*Primary Examiner*—Alan Cariaso
*Attorney, Agent, or Firm*—Cushman Darby & Cushman IP Group of Pillsbury Madison & Sutro LLP

[57] ABSTRACT

A lens for a light distribution has an incident surface and an exit surface, where the exit surface is an aspheric surface so that an aberration of the outer periphery in the horizontal direction can be larger than an aberration of the outer periphery in the vertical direction of the exit surface. Among light distributions formed by an outgoing light emitted from the exit surface, a light distribution in the horizontal direction blurs on the peripheral portion but a light distribution in the vertical direction does not blur on the peripheral portion.

21 Claims, 9 Drawing Sheets

ILLUMINATING DEVICE WITH A LIGHT DISTRIBUTING LENS

BACKGROUND OF THE INVENTION

1. Field of the Invention

The present invention relates to an illuminating device with a light distributing lens and, more particularly, to an illuminating device adapted for use in a vehicle.

2. Description of Related Art

Conventionally, a headlamp for a vehicle, in which a light distribution can obtain a desired dispersion in the right and left directions without blurring the boundary between bright and dark portions on the upper edge of the illumination pattern, has been proposed in Japanese Patent Publication No. Hei 4-10163. This is designed to obtain a light distribution dispersing in the right and left directions of a vehicle with a projecting lens by projecting forward a shading edge of a light reflected by a reflective mirror.

However, in such a construction, the outline of a light distribution or illumination pattern in the right and left directions of a vehicle is so clear that sufficient dispersion cannot be obtained. Further, the boundary between the bright and dark portions of the upper edge becomes unclear, it causes glaring against the on-coming vehicles running on the opposite lane.

SUMMARY OF THE INVENTION

In light of this conventional technology, the present invention has an object to improve an illuminating device.

The present invention has another object to provide an illuminating device which provides a clear edge in the vertical direction of the light distribution and dispersion at the edge in the horizontal direction.

According to the present invention, a lens for a light distribution has a light incident surface and a light exit surface, where the exit surface is formed in an aspheric surface so that an aberration in the horizontal direction can be larger than an aberration in the vertical direction of the exit surface. Among light distributions formed by outgoing light emitted from the exit surface, a peripheral portion in the horizontal direction is blurrier than a peripheral portion in the vertical direction.

Preferably, a radius of curvature of the outer periphery of a horizontal cross-section of the aspheric lens surface is formed to be smaller than a radius of curvature of the outer periphery of a vertical cross-section.

More preferably, in order to form the radius of curvature of the outer periphery of the horizontal cross-section of the aspheric lens surface to be smaller than the radius of curvature of the outer periphery of the vertical cross-section, the aspheric lens surface is made of a curved surface that is formed by combining ellipsoids, and the outer periphery of the vertical cross-section of the same lens surface is formed in an ellipsoid.

Preferably, the lens for the light distribution has a total reflective surface inclined by a predetermined angle with respect to the vertical surface of the light axis, and the light distribution formed by the outgoing light from the exit surface is formed to be located slantingly in the vertical direction of the light axis based on the reflection by a total reflective surface.

More preferably, the total reflective surface is formed to stray off the light-axis direction gradually as it goes closer to the exit surface, and also the inclining angle is formed to be gradually smaller as it goes closer to the exit surface.

Thus, with the dispersion of light in the horizontal direction (x-axis direction) of the lens being larger than dispersion of light in the vertical direction (y-axis direction) of the lens, a blurred light distribution in the right and left peripheries can be obtained. Accordingly, in case a road surface is irradiated with a headlamp for a vehicle by using the illuminating device constructed as above, the boundary of bright and dark portions at the upper edge can be clear and the boundary of bright and dark portions can have a blurred light distribution, dispersing widely enough in the right and left directions. Thus, conditions required of an illuminating device for a vehicle to emit light as far as possible and as bright as possible without causing glaring against the on-coming vehicles in the opposite lane, and more importantly to emit the light brighter towards pedestrians, can be satisfied.

BRIEF DESCRIPTION OF THE ACCOMPANYING DRAWINGS

Other features and advantages of the present invention will become more apparent from the following detailed description when read with reference to the accompanying drawings, in which:

FIGS. 1(*a*) to 1(*c*) are schematic views of a principle of the present invention;

Figure 2:
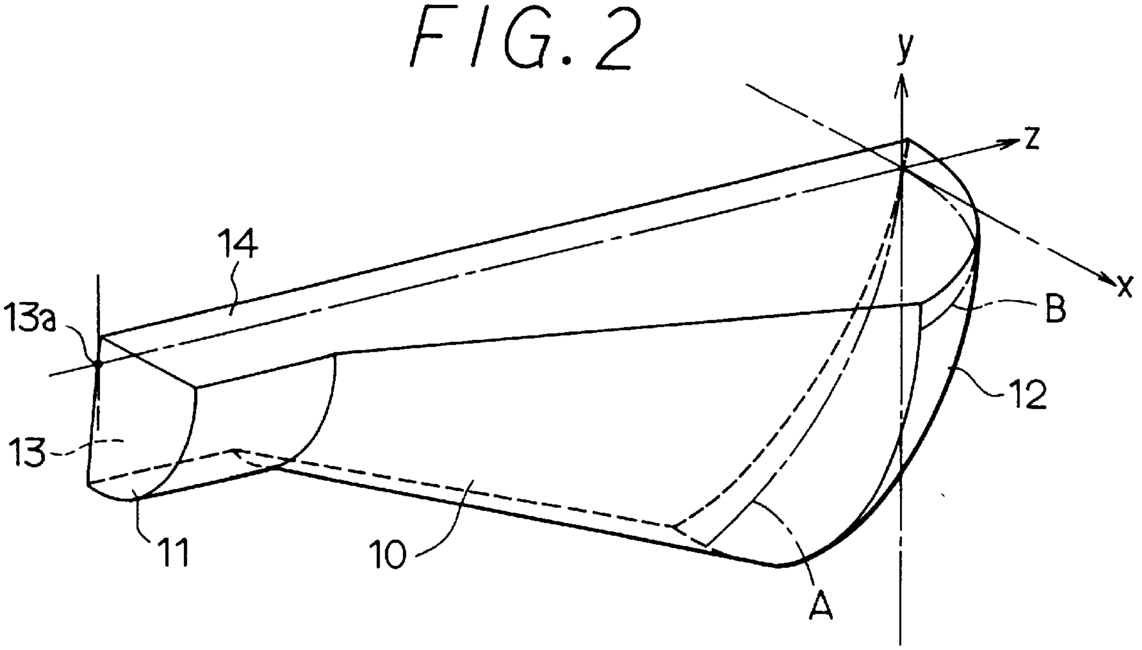
FIG. 2 is a perspective view showing a main portion of a lens for a hot zone light distribution of a first embodiment of the present invention.
Figure 4B:
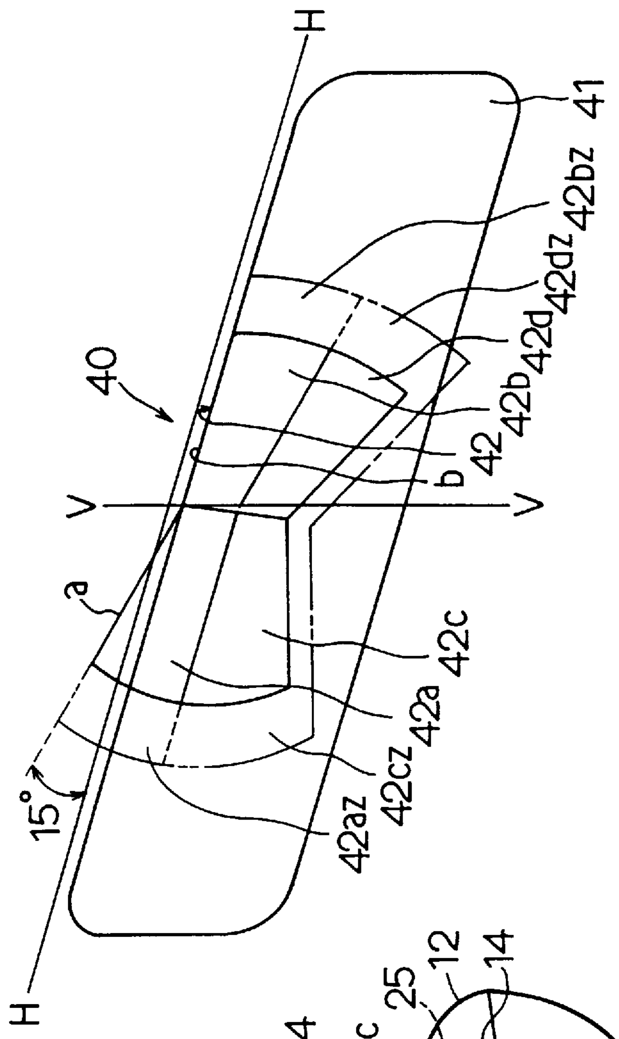
Figure 4A:
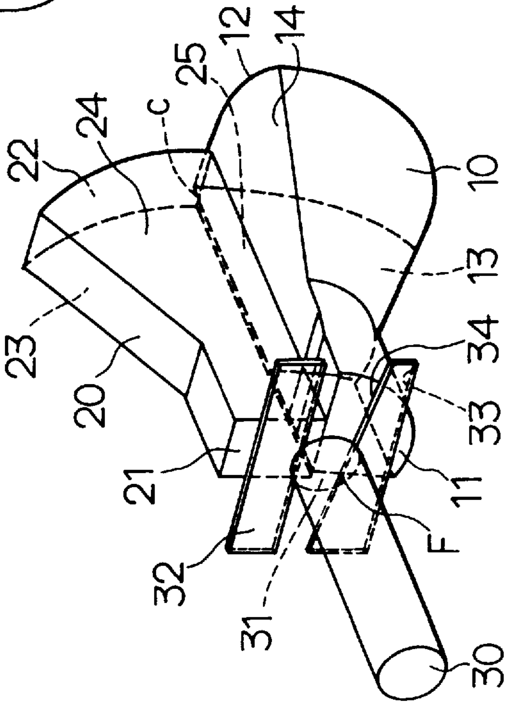
Figure 5:
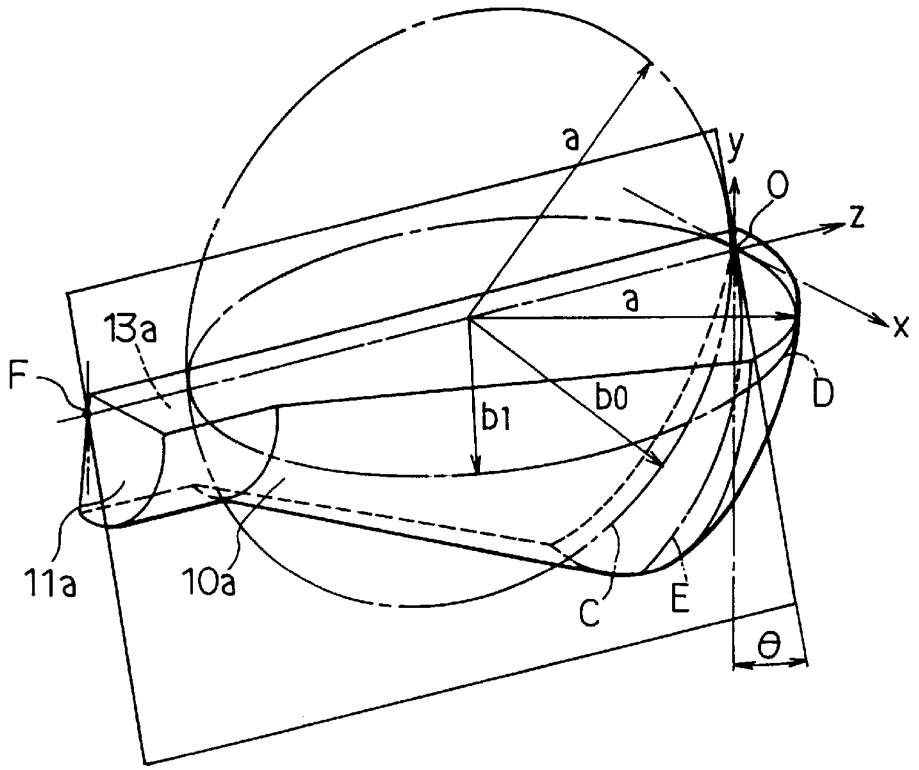
Figure 6:
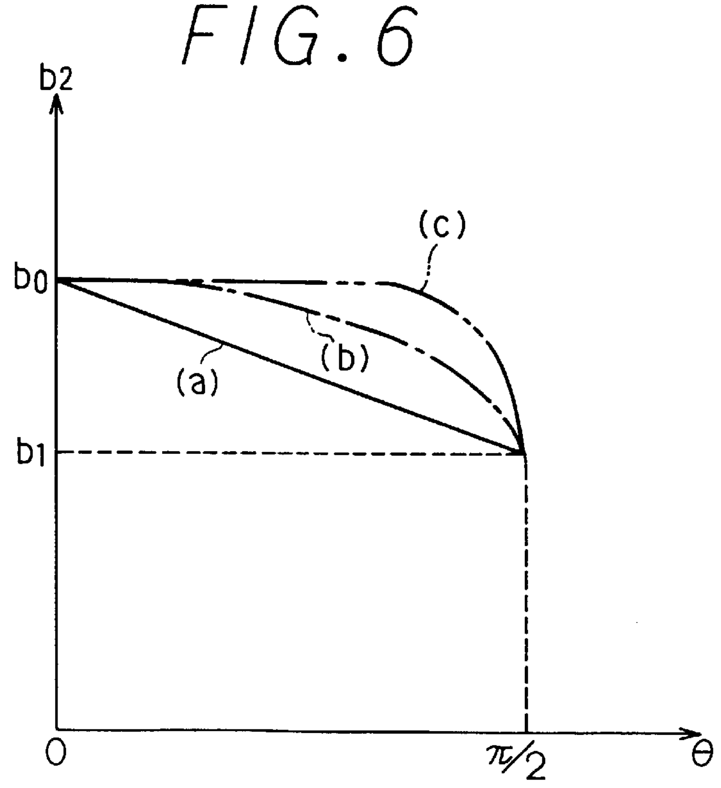
Figure 7A:
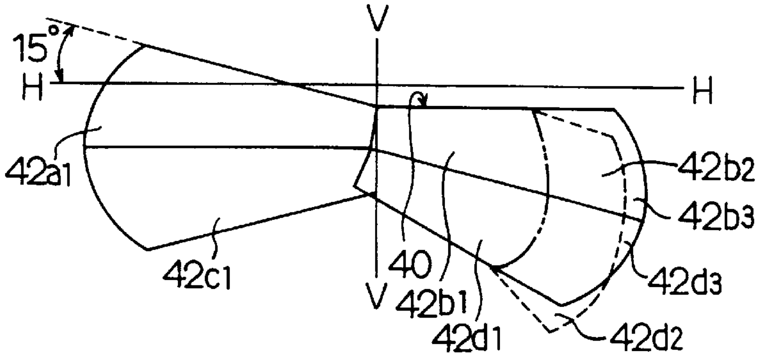
Figure 7B:
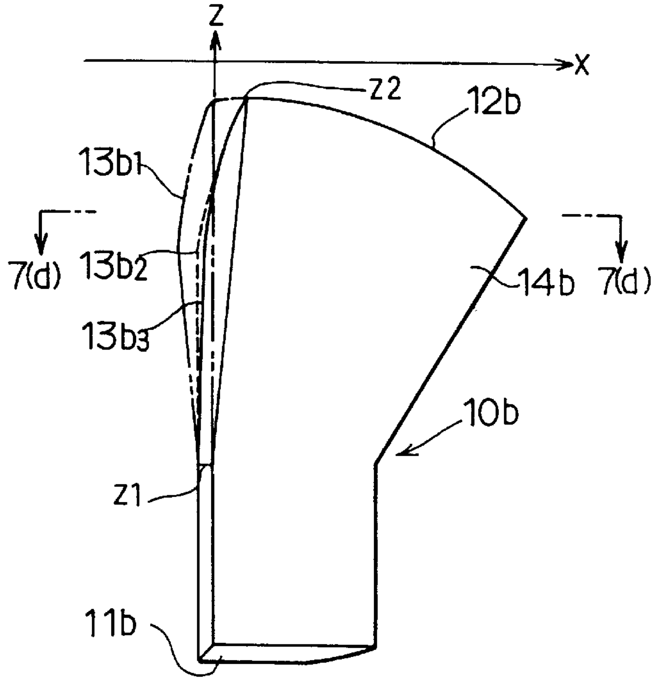
Figure 7C:
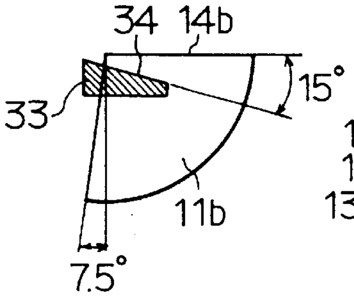
Figure 7D:
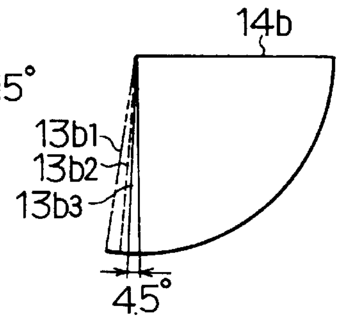
Figure 8B:
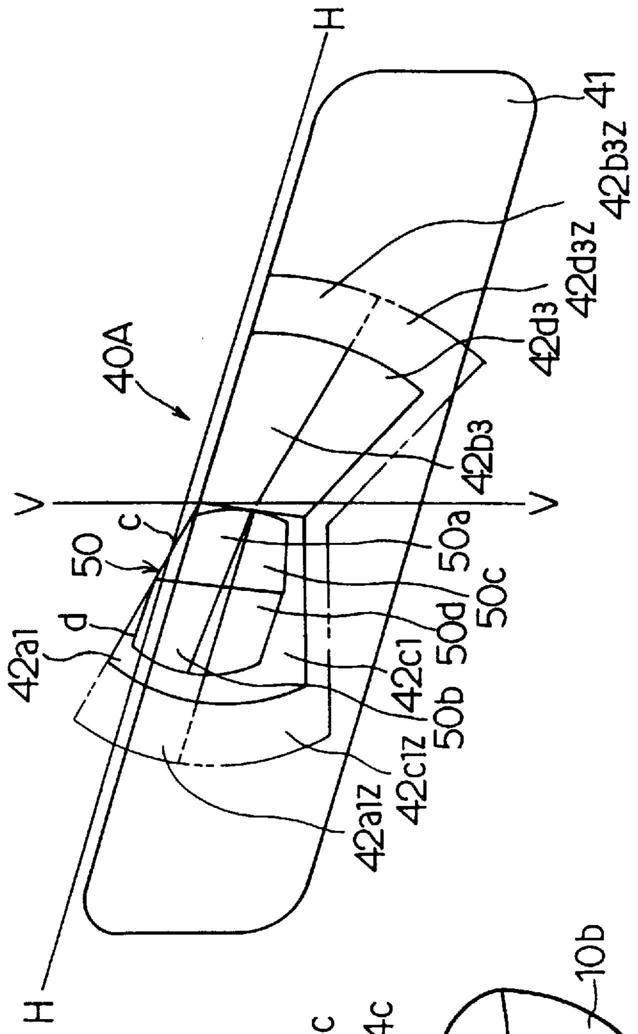
Figure 8A:
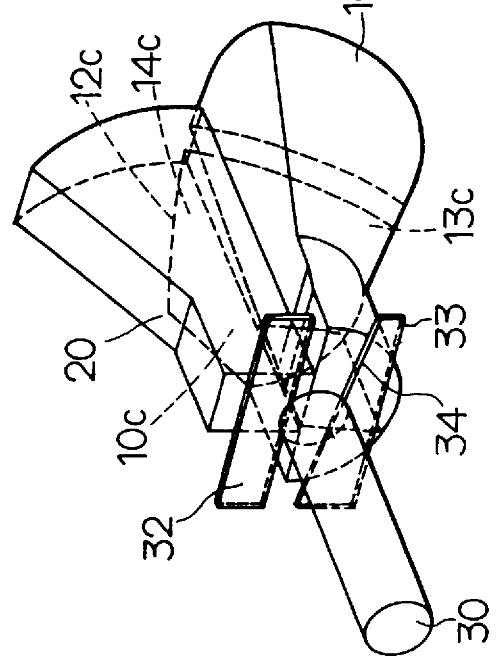
Figure 9:
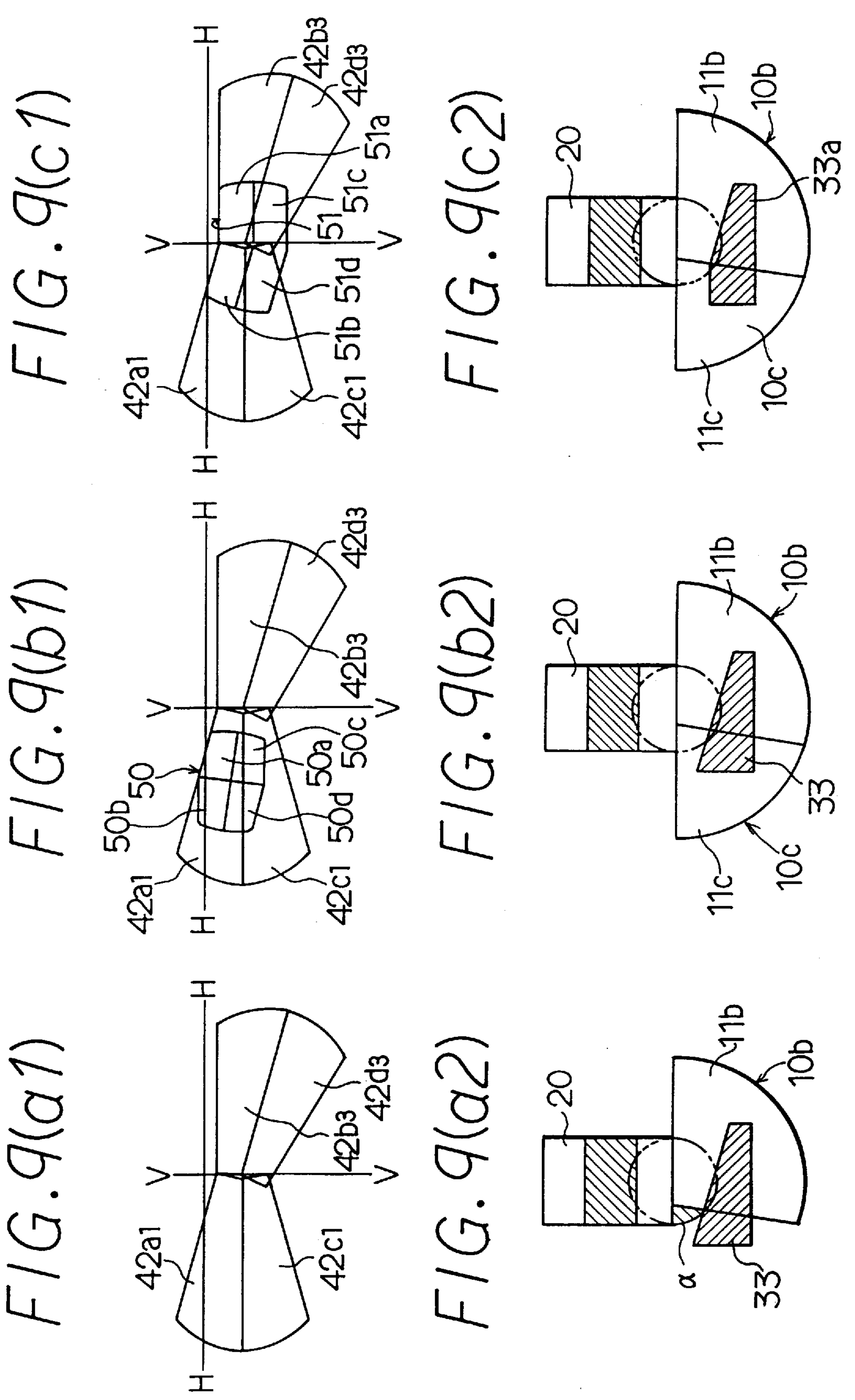
Figure 10B:
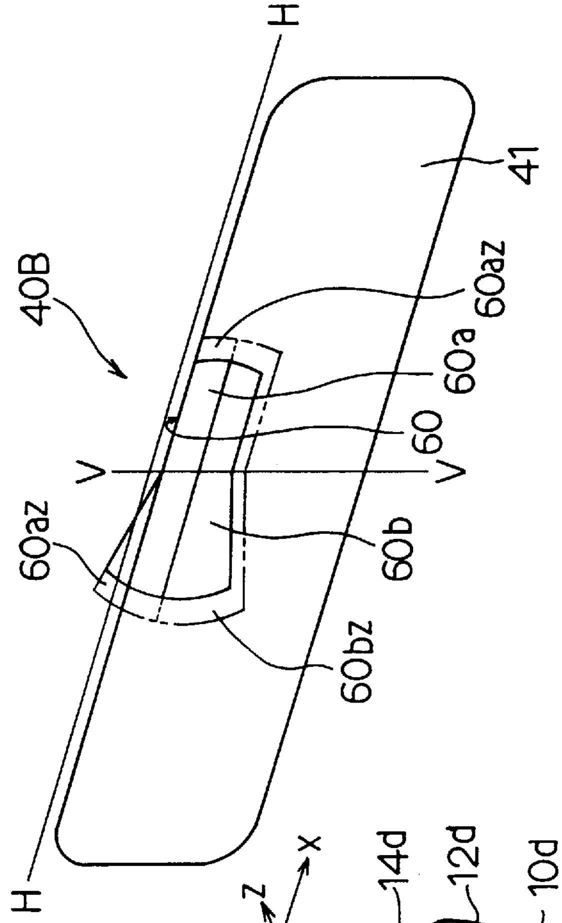
Figure 10A:
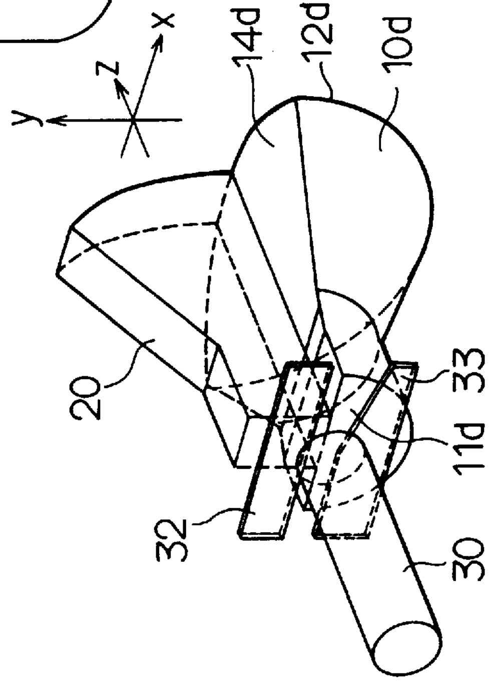
Figure 11B:
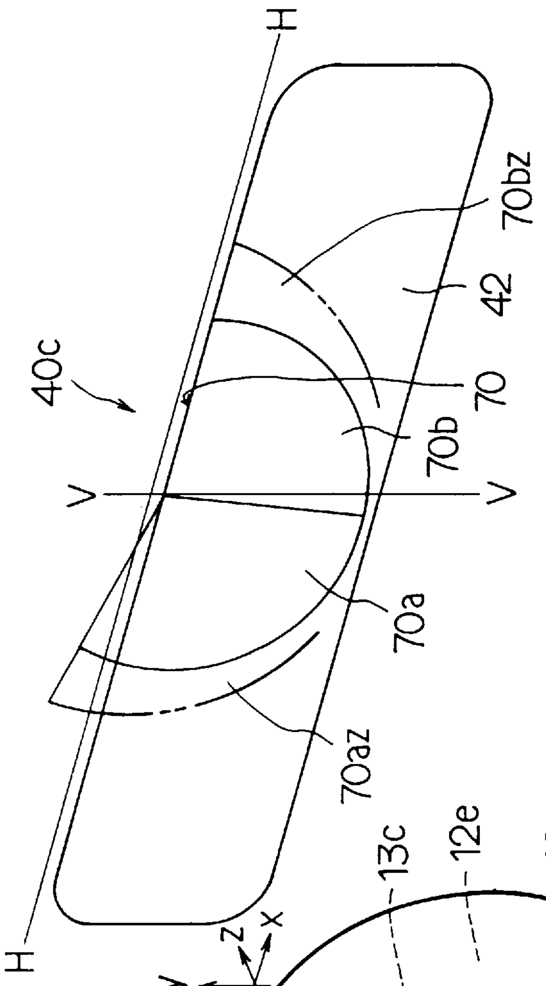
Figure 11A:
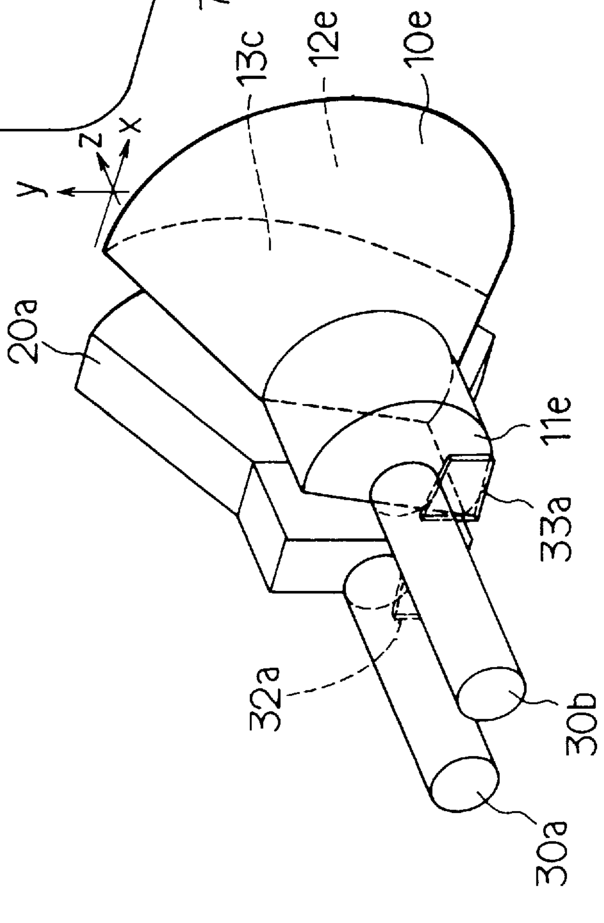

FIGS. 4(*a*) and 4(*b*) are perspective views showing an example where the lens for the hot zone light distribution of FIG. 2 is applied to a headlamp for a vehicle;

FIG. 5 is a perspective view showing a first modification of the first embodiment of the present invention;

FIG. 6 is a view showing a graph for explanation of the first modification of FIG. 5;

FIGS. 7(*a*) to 7(*d*) are schematic views showing a second modification of the first embodiment of the present invention;

FIGS. 8(*a*) and 8(*b*) are schematic views showing a second embodiment of the present invention;

FIGS. 9(*a*1) to 9(*c*2) are schematic views explaining the second embodiment of the present invention;

FIGS. 10(*a*) and 10(*b*) are perspective views showing a third embodiment of the present invention; and FIGS. 11(*a*) to 11(*b*) are perspective views showing a fourth embodiment of the present invention.

DETAILED DESCRIPTION OF THE PRESENTLY PREFERRED EMBODIMENTS

Figure 1A:
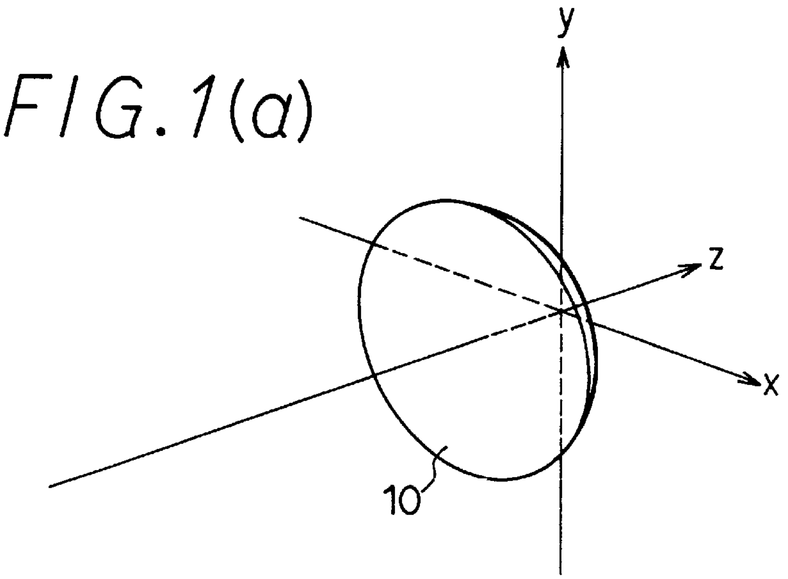
Figure 1B:
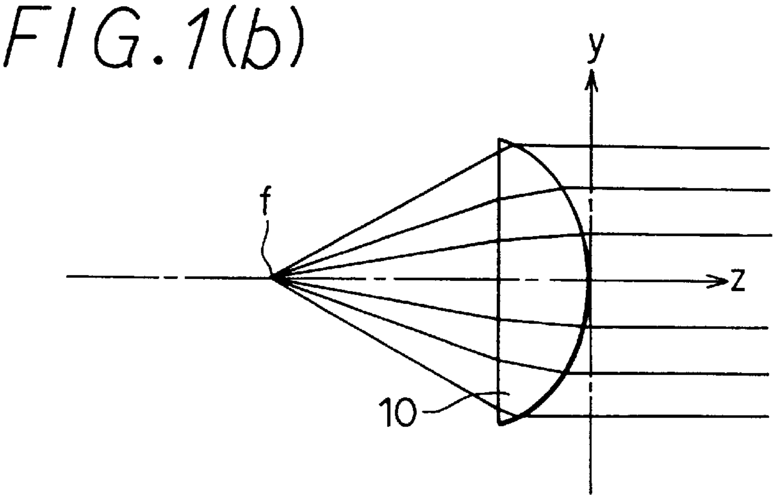
Figure 1C:
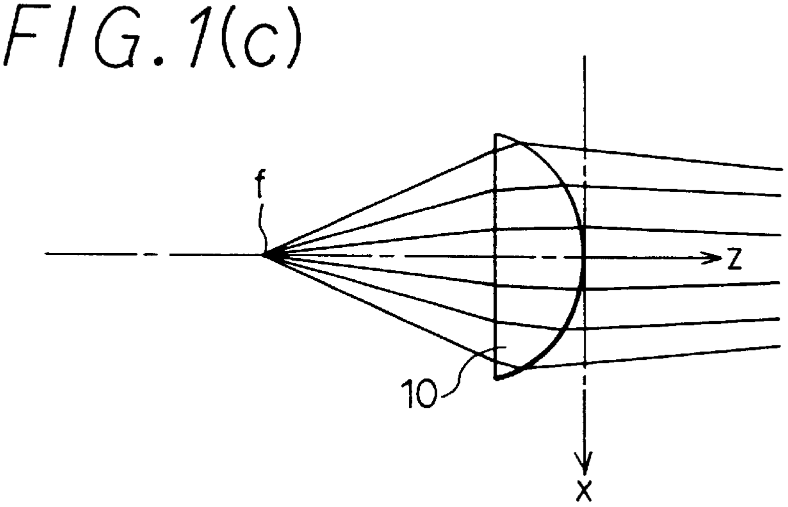

A principle of the present invention is described below with reference to the accompanying drawings. In FIGS. 1(*a*) to 1(*c*) showing the principle of the present invention, where a light-axis of a lens 10 as shown in FIG. 1(*a*) is a z-axis, a horizontal direction of the lens 10 is an x-axis, and a vertical direction of the lens 10 is a y-axis, and light is designed to be emitted from a focal position f of this lens 10. Here, as far as an outgoing light of a vertical cross-section of this lens 10 is concerned, a cross-sectional shape in the vertical direction is so designed as to make a beam emitted from the lens 10 substantially a parallel beam as shown in FIG. 1(*b*). That is, to make an aberration at an infinite-point (this aberration means that light emitted from one point does not converge on one point) substantially zero. On the other hand, outgoing light of the horizontal cross-section of this lens 10 is so designed that a beam emitted from the lens 10 as shown in FIG. 1(*c*) cannot become a parallel beam. That is a cross-sectional shape in the horizontal direction is so designed that an aberration at the infinite-point becomes larger than the aberration of the vertical cross-section.

It has been found that a light does not diffuse in the vertical direction (y-axis), however, a light diffuses widely and flatly in the horizontal (x-axis) direction and also forms a blurred light distribution at the right and left peripheral edge portions if a converged light by a luminous body or a reflector or the like is disposed in the vicinity of the focal position f to irradiate the light in the z-axis direction ahead of the lens surface of the lens 10. Here, the lens 10 is not limited to a one-sided convex lens as shown in FIG. 1(*a*), but it can also be formed by combining biconvex lenses or concaveconvex lenses.

The embodiments of the present invention are explained next.

(First Embodiment)

FIG. 2 shows a perspective view of a lens of the first embodiment. In FIG. 2, the lens 10 according to the present first embodiment is shaped like a roughly one quarter (¼) of a cone, made of material having excellent light transmittance, for example, polycarbonate or acrylic resin material. This lens 10 is composed of a light incident surface 11 where a light flux emitted from a light source not shown in the figure enters in the z-axis direction (a light-axis), a light exit surface 12 forming a lens surface of an aspheric surface described below, a side total reflective surface 13 in the vertical direction with respect to the light-axis, and an upper total reflective surface 14 in the horizontal direction with respect to the light-axis.

Here, a vertical cross-sectional (z–y plane) outer periphery A of the exit surface 12 is shaped like a lens having a focal point in the vicinity of a crossing point 13*a* between the incident surface 11 and the z-axis. Furthermore, a horizontal cross-sectional (z–x plane) outer periphery B has a focal point in the vicinity of a crossing point 13*a* between the incident surface 11 and the z-axis, however, the shape of the lens has a larger aberration than the vertical cross-sectional (z–y plane) outer periphery A. The horizontal cross-sectional (z–x plane) outer periphery B is a curved surface shifting gradually along the y-axis of the vertical cross-sectional (z–y plane) outer periphery A, while the vertical cross-sectional (z–y plane) outer periphery A is a curved surface shifting gradually along the x-axis of the horizontal cross-sectional (z–x plane) outer periphery B. Specifically, if a radius of curvature of the horizontal cross-sectional (z–x plane) outer periphery B is made smaller than a radius of curvature of the vertical cross-sectional (z–y plane) outer periphery A, the direction and the size of the aberration is in a state shown in FIG. 3.

Figure 3:
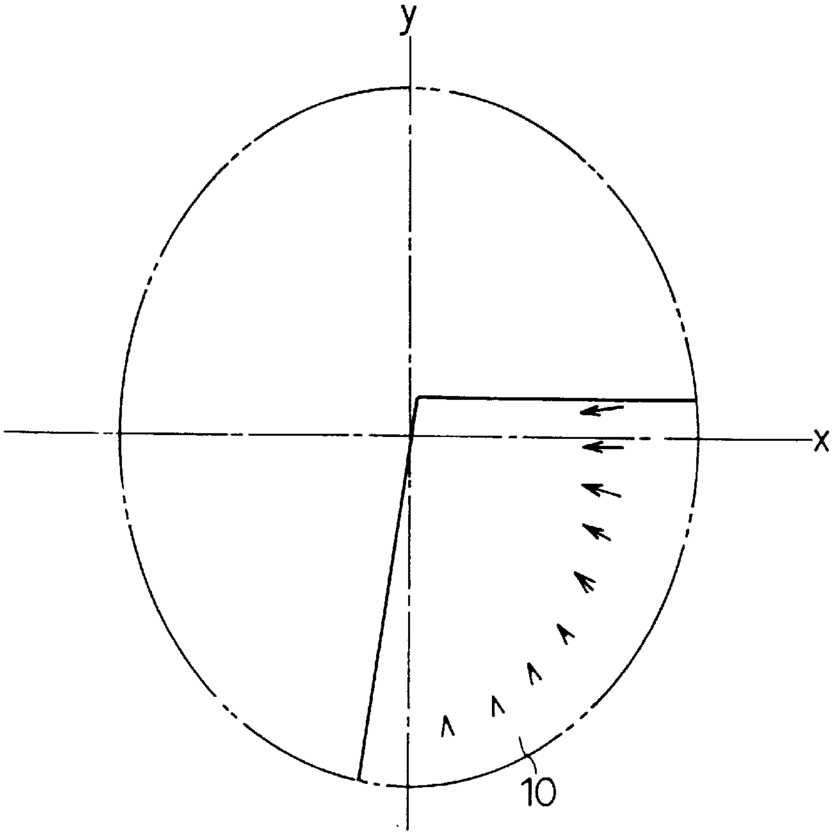
FIG. 3 is a vectorial view showing an aberration of the lens for the hot zone light distribution of FIG. 2.

FIG. 3 is a view where the aberration of the beam seen from the incident direction (z-axis direction) of a light of the exit surface 12 is indicated by vectors (arrow marks in the figure). From FIG. 3, it is understood that the aberration of the lens 10 becomes larger in the horizontal direction (x-axis direction), the aberration conversely becomes smaller as it goes closer to the vertical direction (y-axis direction). Therefore, the light distribution does not disperse widely in the vertical direction (y-axis direction) in order not to cause glaring against the on-coming vehicles running in the opposite lane, however it disperses widely in the horizontal direction (x-axis direction) which causes a blurred light distribution at the peripheral portions. Thus, light intensity in the horizontal direction (x-axis direction) so smoothly decreases that uneven distribution of light which may be caused by a sudden change of the light intensity can be prevented.

Hereinafter, an example which adopts the above-described lens 10 to a low beam of a headlamp for a vehicle is explained. FIGS. 4(*a*) and 4(*b*) are views showing an example which adopts the lens 10 to a low beam of a headlamp for a vehicle. In FIG. 4(*a*) showing a headlamp for a vehicle, the headlamp comprises an optical fiber 30 emitting a light by entering the light generated by an electrically-driven light source not shown in the figure, a lens 20 for a flat light distribution forming a flat light distribution 41 (a light distribution made of very widely area dispersed light right and left below the horizontal-axis H—H of FIG. 4(*b*)) by entering the light transmitted through this optical fiber 30, and the lens 10 for hot zone light distribution forming a hot zone light distribution 42 (as shown in FIG. 4(*b*), a light distribution overlapping near the center of the flat light distribution and illuminating far away from the vehicle). Moreover, FIG. 4(*b*) shows a light distribution 40 formed by the light irradiated by the lens 20 for the flat distribution and the lens 10 for the hot zone light distribution.

The lens 20 for the flat light distribution made of such a material having excellent light transmittance as a polycarbonate or acrylic resin material is substantially formed in the shape of a fan. This lens 20 for the flat light distribution comprises an incident surface 21 partially glued with a transparent adhesive via a shade 32 at the upper portion of the exit surface 31 of the optical fiber 30, an exit surface 22 forming a biconvex lens for upper and lower portions, left and right side surfaces 23, 24 forming reflective surfaces, respectively, and a bottom surface 25 forming the same reflective surface. The focal point of this lens 20 for the flat light distribution is designed to be placed in the vicinity of the incident surface 21.

The lens 10 for the hot zone light distribution comprises an incident surface 11 partially glued with a transparent adhesive via a shade 33 at the lower portion of the optical fiber 30, an exit surface 12 forming the direction and the size of the aberration as shown in FIG. 3 by making a radius of curvature of the horizontal cross-sectional (z–x plane) outer periphery B smaller than a radius of curvature of the vertical cross-sectional (z–y plane) outer periphery A as shown in FIG. 2, a side total reflective surface 13 forming an inclined surface inclining in the clockwise direction by 7.5° with respect to the vertical surface along the irradiating direction, and another upper total reflective surface 14 forming a horizontal surface.

It is to be understood that the incident surfaces 11 and 21 may be disposed as closely as possible to the optical fiber 30 without using adhesives.

The upper total reflective surface 14 is adjacent to the side total reflective surface 13 as a boundary of a line c along the irradiating direction at the upper edge of the side total reflective surface 13. The shade 33 has a cut line 34 inclining by a predetermined angle (for example, 15°) to the lower right toward the irradiating direction, with respect to the horizontal surface. In addition, the focal position F of the lens surface in the vertical direction of the exit surface 12 is placed near the incident surface 11, and is designed to be positioned at a crossing point between the side total reflective surface 13 and the cut line 34 of the shade 33.

Furthermore, the focal position of the lens surface in the horizontal direction of the exit surface 12 is set near the focal position F of the lens surface in the vertical direction.

In the light distribution 40, as for some incident light entering the incident surface 11 of the lens 10 for the hot zone light distribution from the optical fiber 30, the hot zone light distribution 42 has an area 42*a* formed by direct light emitted from the direct exit surface 12 without reflecting on the side total reflective surface 13 and the upper total reflective surface 14 and an area $42a_z$ dispersing blurredly due to the aberration. Because the cut line 34 of the shade 33 inclines based on the focal position F of the exit surface 12 by a predetermined angle (for example, 15° ) to the lower right toward the irradiating direction, these areas 42*a* and $42a_z$ have the upper edge a inclining to the upper left by 15° from the horizontal axis H—H as shown in FIG. 4(*b*).

Furthermore, the hot zone light distribution 42 has an area 42*b* formed by reflected light emitted from the exit surface 12 after reflecting on the side total reflective surface 13 and an area $42b_z$ dispersing blurredly due to the aberration. Based on the focal position F of the exit surface 12, as shown in FIG. 4(*b*), these areas 42*b* and $42b_z$ are positioned having a substantially horizontal upper edge b immediately below the horizontal axis H—H. In addition, the hot zone light distribution 42 has an area 42*c* formed by a reflected light emitted from the exit surface 12 after reflecting on the upper total reflective surface 14 and an area $42c_z$ dispersing blurredly due to the aberration. Moreover, it has an area 42*d* formed by re-reflected light emitted from the exit surface 12 after reflecting on the side total reflective surface 13 again, posterior to reflecting on the upper total reflective surface 14 and an area $42d_z$ dispersing blurredly due to the aberration. These areas 42*c*, $42c_z$, 42*d*, and $42d_z$ are formed, based on the focal position F of the exit surface 12, as shown in FIG. 4 (*b*), immediately below the respective areas 42*a* and $42a_z$, and immediately below the respective areas 42*b* and $42b_z$.

Here, in the hot zone light distribution 42, an additional area also exists which is formed by re-reflected light emitted from the exit surface 12 after reflecting on the upper total reflective surface 14 again, posterior to reflecting on the side total reflective surface 13, however, the intensity of illumination of this area is so low that its illustration is omitted.

Furthermore, in case a headlamp of an illuminating device for a vehicle of the present embodiment is used, although laws, regulations or the like generally requires a vehicle to run on either the right lane or the left lane, the hot zone light distribution illuminating a far distant area without causing glaring against the on-coming vehicle can be obtained whether it is the right or the left traffic system by positioning the areas 42*a* and $42a_z$ located at the upper side to the left side in case of a vehicle running on the left lane and by positioning the same areas to the right side in case of a vehicle running on the right lane. In this instance, as far as a reflective surface (the side total reflective surface 13 in case of FIG. 4(*a*)) in the vertical direction is concerned, it should be disposed, inclining to the left side for a vehicle running on the left lane and to the right side for a vehicle running on the right side lane from the incident surface of the lens 10 for the hot zone light distribution.

(First Modification)

The closer the aberration in the vertical direction (z–y plane) of the exit surface 12 of the lens 10 for the hot zone light distribution comes to zero, the less it causes glaring against the on-coming vehicles running on the opposite lane. Therefore it is considered that the shape of the lens surface of the exit surface 12 makes the aberration in the vertical direction (z–y plane) substantially zero in the present first modified embodiment. As a result, in order to make the aberration in the vertical direction (z–y plane) to be substantially zero, it is desirable for the shape of the lens surfaces of the exit surface 12 to be a curved surface composed of a combination of elliptical-shaped lens surface of the exit surface 12.

FIG. 5 is a view showing a lens 10*a* for a hot zone light distribution shaped like a curved surface composed of a combination of elliptical-shaped lens surfaces of the exit surface. In FIG. 5, when the longer diameter of the outer peripheral ellipsoid C of the vertical cross-section (z–y plane) of the lens 10*a* for the hot zone light distribution is a, the shorter diameter is $b_0$, and the original points of the x-axis, the y-axis, and the z-axis are taken at the vertex of the lens 10*a* for the hot zone light distribution, the outer peripheral ellipsoid C of the vertical cross-section (z–y plane) is expressed by the following equation 3.

[Equation 3]

$$y^2/b_0^2+(z+a)^2/a^2=1$$

Further, when the longer diameter of the outer peripheral ellipsoid D of the horizontal cross-section (z–x plane) is a, and the shorter diameter is $b_1$, the outer peripheral ellipsoid D of the horizontal cross-section (z–x plane) is expressed in the following equation 4.

[Equation 4]

$$x^2/b_1^2+(z+a)^2/a^2=1$$

Here, if the shorter diameter $b_0$ of the outer peripheral ellipsoid C of the vertical cross-section is larger than the shorter diameter $b_1$ of the outer peripheral ellipsoid D of the horizontal cross-section ($b_0>b_1$), the radius of curvature of the outer peripheral ellipsoid D of the horizontal cross-section becomes smaller than the radius of curvature of the outer peripheral ellipsoid C of the vertical cross-section, thus, the aberration shown in FIG. 3 is provided.

In this case, when the shorter diameter of the outer peripheral ellipsoid E of a cross-section in a surface inclining by θ° from the y-axis is $b_2$, and if this shorter diameter $b_2$ is changed continuously from $b_0$ to $b_1$ with respect to θ, the aberration is not apt to occur in the vertical direction, so that a light distribution disperses owing to its aberration in the horizontal direction and does not cause glaring against the on-coming vehicles in the opposite lane. In order to change $b_2$ continuously from $b_0$ to $b_1$ with respect to θ, for example, as shown with a curved line (a) in FIG. 6, the shorter diameter $b_2$ has to be linearly changed from $b_0$ to $b_1$ as θ becomes closer to π/2 (x-axis) from zero (y-axis), or as shown with a curved line (*b*) of FIG. 6, the shorter diameter b2 has to be non-linearly changed from $b_0$ to $b_1$ as θ becomes closer to π/2 (x-axis) from zero (y-axis), or as shown with a curved line (c) in FIG. 6, when θ is between zero (y-axis) and nearby π/2 (x-axis), the shorter diameter $b_2$ should be left as $b_0$, however, the shorter diameter $b_2$ should be abruptly changed to $b_1$ between nearby π/2 (x-axis) and π/2 (x-axis). In this case, as shown with the curved line (c) in FIG. 6, when the shorter diameter $b_2$ is abruptly changed to $b_1$ between nearby π/2 (x-axis) and π/2 (x-axis), the aberration is not apt to occur furthermore in the vertical direction, which prevents glaring against the on-coming vehicles running in the opposite lane.

Moreover, in the first modified embodiment, although the size of the aberration is adjusted by changing the shorter diameters of the outer peripheral ellipsoids of the vertical cross-section and the horizontal cross-section of the lens 10*a* for the hot zone light distribution, the size of the aberration can be adjusted by changing the longer diameter, or the size of the aberration can be adjusted by changing both the longer and shorter diameters at the same time. Furthermore, the lens surface of the exit surface is in the shape of an ellipsoid in order to adjust the aberration, however, it may be able to be shaped in a curved surface other than an ellipsoidal shape.

(Second Modification)

In the lens 10, 10*a* for the hot zone light distribution of the first embodiment and the first modification, it is substantially shaped like one quarter (¼) of a cone, and also the side total reflective surfaces 13 and 13*a* are disposed inclining to the left side with respect to the light-axis direction (z-axis direction) by 7.5°, accordingly, the aberration direction is primarily in the left to upper left direction, which inclines the hot zone light distribution toward the left (FIGS. 4(*a*) and 4(*b*)). In order to compensate this, in the present second modified embodiment, a modification is performed on the total reflective surface of a side surface as shown in FIGS. 7(*a*) and 7(*b*).

FIG. 7(*a*) is a view showing light distribution characteristics when a side total reflective surface of a lens 10*b* for hot zone light distribution is modified. On the other hand, FIG. 7(*b*) shows a perspective view of the lens 10*b* for the hot zone light distribution taken from the above, FIG. 7(c) shows a shape of an incident surface 11*b* of the lens 10*b* for hot zone light distribution, and FIG. 7(*d*) is a view showing a cross-sectional shape taken along the line 7(*d*)—7(*d*) in FIG. 7(*b*).

In the case of a vehicle for running on the left side, to improve visibility at the footpath side, as shown in FIG. 7(*a*), it is required to incline it toward upper left by 15° from the horizontal-axis H—H. For that purpose, the side total reflective surface 13*b* of the lens 10*b* for the hot zone light distribution has, as shown with a two-dot line in FIG. 7(*c*) and FIG. 7(*b*) and FIG. 7(*d*), an inclined surface $\mathbf{13}b_1$ inclining toward the left side by 7.5° with respect to the vertical surface along the irradiating direction, and a cut line 34*b* of a shade 33*b* also inclines toward the lower right by 15° along the irradiating direction.

When the inclined surface $\mathbf{13}b_1$ is disposed, similarly to the above-described first embodiment, the light distribution characteristic, as shown in FIG. 7(*a*), has an area formed by direct light $\mathbf{42}a_1$, an area $\mathbf{42}b_1$ (inside of the two-dot line of FIG. 7(*a*)) formed by the reflective light oh the inclined surface $\mathbf{13}b_1$, an area $\mathbf{42}c_1$, formed by the reflective light on an upper total reflective surface 14*b*, and an area $\mathbf{42}d_1$ (inside of the two-dot line of FIG. 7(*a*)) formed by re-reflected light, i.e., the reflective light on the upper surface reflective surface 14*b* reflected again on the inclined surface $\mathbf{13}b_1$. In FIG. 7(*a*), there is an area dispersing blurredly due to the aberration of the lens 10*b* for the hot zone light distribution as shown in FIG. 4(*b*), however, its illustration is omitted in this case.

Here, as shown with broken lines of FIG. 7(*b*) and FIG. 7(*d*), by making a portion of the inclined surface $\mathbf{13}b_1$ an inclined surface $\mathbf{13}b_2$ inclining toward the x-axis positive direction, the right edge portion of the hot zone light distribution can be extended in the right direction, however, as shown with a broken line of FIG. 7(*a*), it is extended to the lower right side (areas $\mathbf{42}b_2$ and $\mathbf{42}d_2$ inside a broken line of FIG. 7 (*a*)) owing to the aberration of the lens 10*b* for the hot zone light distribution, so that visibility of a distant area at the right side decreases. To compensate this, as shown with a solid line of FIG. 7(*b*) and FIG. 7(*d*), by making a portion of the inclined surface $\mathbf{13}b_2$ an inclined surface $\mathbf{13}b_2$ awry toward the x-axis positive direction, as shown with a solid line of FIG. 7(*a*), the extended portion to the lower right side of the right edge portion of the hot zone light distribution can be compensated to the upper side (areas $\mathbf{42}b_3$ and $\mathbf{42}d_3$ inside a solid line of FIG. 7(*a*)).

By making such a compensation, as shown in FIG. 7(*d*), the inclined surface $\mathbf{13}b_3$ of the cross-section F—F becomes an inclined surface of 4.5°, thus a smooth surface can be continuously formed between a point $Z_1$ at the incident side of the light of the inclined surface $\mathbf{13}b_3$ and a point $Z_2$ at the exit side. Furthermore, the surface between the point $Z_1$ at the incident side and the point $Z_2$ at the exit side can be formed in plural surfaces, or may be formed in a curved surface.

Furthermore, in the second modified embodiment, similarly to the case of the first embodiment, in case a headlamp of an illuminating device for a vehicle of the present second modified embodiment is used, the hot zone light distribution illuminating a far distant area without causing glaring against the on-coming vehicle can be obtained whether it is the right or the left traffic system by positioning the area $\mathbf{42}a_1$, located at the upper side to the left side in the case of a vehicle running in the left lane and by positioning the same area to the right side in the case of a vehicle running in the right lane. In this case, as far as a reflective surface (the inclined surface $\mathbf{13}b_3$ in case of FIG. 7(*d*)) in the vertical direction is concerned, it should be disposed inclined to the left side for a vehicle running in the left lane and to the right side for a vehicle running in the right lane from the incident surface of the lens 10*b* for the hot zone light distribution.

(Second Embodiment)

In the first embodiment and its modified embodiments, although explanations have been made for a lens substantially shaped like one quarter (¼) of a cone used for a lens for hot zone light distribution, two lenses substantially shaped like one quarter (¼) of a cone can be combined to make them one lens substantially shaped like one half (½) of a cone, so that it can be a lens for hot zone light distribution. In FIG. 8(*a*), two lenses substantially shaped like one quarter (¼) of a cone are combined to make a lens substantially shaped like one half (½) of a cone. This lens may be used for hot zone light distribution applied to a low beam of a head lamp for a vehicle. The present second embodiment, in order to make the lens in the shape of a substantially one half (½) of a cone, comprises the lens 10*b* for the hot zone light distribution as in the foregoing embodiments and an additional lens 10*c* for hot zone light distribution having a total reflective surface vertically disposed with respect to the light-axis at a side surface.

FIG. 8(*a*) illustrates a headlamp for a vehicle, whose headlamp comprises the optical fiber 30 emitting light by entering the light generated by a light source, not shown in the figure, the lens 20 for flat light distribution forming the flat light distribution 41 by entering the light transmitted through this optical fiber 30, the lens 10*b* for the hot zone light distribution forming a hot zone light distribution, and another lens 10*c* for the hot zone light distribution. Moreover, FIG. 8(*b*) shows a light distribution 40A formed by the light irradiated by the lens 20 for the flat distribution, the lens 10 for the hot zone light distribution and another lens 10*c* for the hot zone light distribution.

In FIGS. 8(*a*) and 8(*b*), since the lens 20 for the flat light distribution, the optical fiber 30, the shades 32, 33 and the flat light distribution 41 are respectively the same as the lens 20 for the flat light distribution, the optical fiber 30, the shades 32, 33 and the flat light distribution 41 in the first embodiment of FIG. 4, explanations therefor are omitted. Also, in FIGS. 8(*a*) and 8(*b*), since the lens 10*b* for the hot zone light distribution and hot zone light distributions $43a_1$, $43b_3$, $43c_1$, and $43d_3$ are respectively the same as the lens 10*b* for the hot zone light distribution and the hot zone light distributions $42a_1$, $42b_3$, $42c_1$, and $42d_3$ of FIG. 7, explanations therefor are omitted. Furthermore, similarly to the hot zone light distributions $42a_z$, $42b_z$, $42c_z$, and $42d_z$ of FIG. 4, the respective hot zone light distributions $43a_{1z}$, $43b_{3z}$, $43c_{1z}$, and $43d_{3z}$, of FIG. 8(*b*) show areas of the peripheries of respective hot zone distributions $42a_1$, $42b_3$, $42c_1$, and $42d_3$ dispersing blurredly owing to the aberration.

Because the lens 10*c* for the hot zone light distribution shown in FIG. 8(*a*) has a side total reflective surface 13*c* vertically disposed with respect to the light-axis at the side surface, as shown in FIG. 8(*b*), the hot distribution 50 has an area 50*a* formed by direct light emitted from the direct exit surface 12*c* without being reflected on the side total reflective surface 13*c* and the upper total reflective surface 14*c*. Since the cut line 34 of the shade 33 inclines, based on the focal position of the exit surface 12*c*, by a predetermined angle (for example, 15°) to the lower right toward the irradiating direction, this area has an upper edge c inclining to the upper left by 15° from the horizontal axis H—H as shown in FIG. 8(*b*).

Furthermore, the hot zone light distribution 50 has an area 50*b* formed by reflected light emitted from an exit surface 12*c* after reflecting on a side total reflective surface 13*c*. Based on the focal position of the exit surface 12*c*, as shown in FIG. 8(*b*), this area 50*b* is positioned to have a substantially horizontal upper edge d immediately below the horizontal axis H—H. In addition, the hot zone light distribution 50 has an area 50*c* formed by reflected light emitted from the exit surface 12*c* after being reflected on the upper total reflective surface 14*c*. Moreover, it has an area 50*d* formed by a re-reflected light emitted from the exit surface 12*c* after being reflected on the side total reflective surface 13*c* again, posterior to reflecting on the upper total reflective surface 14*c*. These areas 50*c* and 50*d* are respectively formed, based on the focal position of the exit surface 12*c*, as shown in FIG. 8(*b*), immediately below the respective areas 50*a* and 50*b*.

Each of FIGS. 9(*a*1) to 9(*c*2) is a view showing a difference in the characteristics of each hot zone light distribution between the case where one lens substantially shaped like a quarter (¼) of a cone is employed as a lens for the hot zone light distribution and the case where one lens substantially shaped like one half (½) of a cone by combining two lenses substantially shaped like a quarter (¼) of a cone. In more detail, FIG. 9(*a*2) shows the shapes of the incident surface 11*b* of the lens 10*b* for the hot zone light distribution and the shade 33 of FIG. 7(*b*), while FIG. 9(*a*2) shows a characteristic of the hot zone light distribution. FIG. 9(*b*2) shows the shapes of the incident surfaces 11*b* and 11*c* of the lenses 10*b* and 10*c* for the hot zone light distribution, and the shade 33 of FIG. 8(*a*), and FIG. 9(*b*1) shows the same characteristic of the hot zone light distribution as in FIG. 8(*b*). FIG. 9(*c*2) shows the shapes of the incident surfaces of the lenses 10*b* and 10*c* for the hot zone light distribution, and the shade 33 of FIG. 8(*b*), and FIG. 9 (*c*1) shows a characteristic of the hot zone light distribution.

As is obvious from FIGS. 9(*a*1) to 9(*c*2), by additionally providing the lens 10*c* for the hot zone light distribution, in addition to the hot zone light distributions $42a_1$, $42b_3$, $42c_1$, and $42d_3$ which can illuminate a distant area without causing glaring against the on-coming vehicles running in the opposite lane, it is possible to form a second hot zone light distribution 50 or 51 enabling it to illuminate a desired targeted place in a distant area. In this case, by adding the lens 10*c* for the hot zone light distribution, an incident light (referred to a shaded portion (a in FIG. 9(*a*2)) which cannot be used when only using the lens 10*b* for the hot zone light distribution can be used, thus, usage efficiency of light is improved. Moreover, The second hot zone light distribution 50 can irradiate the upper left portion in a distant area, by making the shape of the shade 33 as shown in FIG. 9(*b*2), and also can irradiate the center portion in a distant area, by making the shape of the shade 33 as shown in FIG. 9(*c*2).

In the present second embodiment, although an explanation has been made based on the case of disposing the lens 10*b* for the hot zone light distribution at the left side in the light irradiating direction and disposing the lens 10*c* for the hot zone light distribution at the right side in the light irradiating direction, the right and left positions of these lenses 10*b* and 10*c* for the respective hot zone light distributions may be reversed. Furthermore, similarly to the first embodiment, the present second embodiment has been explained in case the illuminating device for a vehicle of the present second embodiment is used as a headlamp for a vehicle running in the left lane, however, in case it is used as a headlamp for a vehicle running in the right lane, the lenses 10*b* and 10*c* for the hot zone light distribution, and the shade 33 or shade 33*a* should be used by disposing them symmetrically.

(Third Embodiment)

Hereinafter, the third embodiment of the present invention is explained based on FIGS. 10(*a*) and 10(*b*). FIG. 10(*a*) is a perspective view showing a headlamp for a vehicle employing a lens substantially shaped like one half (½) of a cone of the present third embodiment as the hot zone light distribution as well as a view showing a characteristic of the light distribution. In FIG. 10(*a*), a headlamp for a vehicle comprising the optical fiber 30 emitting light by entering the light generated by a light source not shown in the figure, the lens 20 for the flat light distribution forming the flat light distribution 41 by entering the light transmitted through this optical fiber 30, and the lens 10*d* for the hot zone light distribution in the shape of a substantially one half (½) of a cone forming a hot zone light distribution 60. In addition, FIG. 10(*b*) shows a light distribution 40B formed by light irradiated by the lens for the flat light distribution 20 and the lens 10*d* for the hot zone light distribution 10*d*. In FIG. 10(*a*) and FIG. 10(*b*), because the lens 20 for the flat light distribution, the optical fiber 30, the shades 32, 33, and the flat light distribution 41 are respectively the same as the lens 20 for the flat light distribution, the optical fiber 30, the shades 32, 33, and the flat light distribution 41 of the first embodiment of FIG. 4(*a*), an explanation therefor is omitted.

A vertical cross-section (z–y plane) of an exit surface 12*d* of the lens 10*d* for the hot zone light distribution of the present third embodiment has a focal point in the vicinity of an incident surface 11*d* and the lens surface has a radius of curvature to be substantially zero aberration. Furthermore, as for the lens surface, a radius of curvature of the horizontal cross-section (z–x plane) of the exit surface 12*d* of the lens 10*d* for the hot zone light distribution is made smaller than a radius of curvature of the vertical cross-section (z–y plane). That is, the aberration of the horizontal cross-section (z–x plane) is formed larger than the aberration of the vertical cross-section (z–y plane). Accordingly, light emitted from the exit surface 12*d* of the lens 10*d* for the hot zone light distribution disperses in the right and left directions, and also can form a hot zone light distribution 60 enabling it to illuminate a far distant area without causing glaring against the on-coming vehicles running in the opposite lane.

The hot zone light distribution 60 shown in FIG. 10(*b*) has an area 60*a* formed by a direct light emitted from direct exit surface 12*d* without reflecting on the upper total reflective surface 14*d*, an area $60a_z$ where the periphery of the area 60*a* disperses blurredly due to the aberration, an area 60*b* formed by reflective light emitted from an exit surface 12*d* after reflecting on the upper total reflective surface 14*d*, and an area $60b_z$ where the periphery of the area 60*b* disperses blurredly due to the aberration.

In the present third embodiment, because the aberration of the horizontal cross-section (x-axis direction) is formed larger than the aberration of the vertical cross-section (y-axis direction), a light emitted from the exit surface 12*d* of the lens 10*d* for the hot zone light distribution disperses in the right and left direction, and also can form a hot zone light distribution 60 enabling it to illuminate a far distant area without causing glaring against the on-coming vehicles running in the opposite lane.

Besides, in the third embodiment, although the lens 20 for the flat light distribution forming the flat light distribution 41 and the lens 10*d* for the hot zone light distribution in the shape of a substantially one half (½) of a cone forming the hot zone light distribution 60 are composed by disposing them vertically, the positions of the lens 20 for the flat light distribution and the lens 10*d* for the hot zone light distribution 10*d* can be reversed in the construction.

(Fourth Embodiment)

In this embodiment, an explanation has been made based on an example which is constructed by disposing the lens 20 for the flat light distribution forming the flat light distribution and the lens 10*d* for the hot zone light distribution in the shape of a substantially one half (½) of a cone forming the hot zone light distribution 60 vertically, however, the lens for the flat light distribution and the lens for the hot zone light distribution in the shape of a substantially one half (½) of a cone can be disposed horizontally in the construction.

Hereinafter, the fourth embodiment of the present invention is explained based on FIGS. 11(*a*) and 11(*b*). FIG. 11(*a*) is a perspective view showing the present fourth embodiment where the lens for the flat light distribution forming the flat light distribution is disposed at the left side in the light-axis direction (z-axis direction) and the lens for the hot zone light distribution using a lens in the shape of a substantially one half (½) of a cone is disposed at the right side of the light-axis direction (z-axis direction), and FIG. 11(*b*) is a view showing a characteristic of the light distribution.

FIG. 11(*a*) shows a headlamp for a vehicle comprising an optical fiber 30*a* emitting light by entering the light generated by a light source not shown in the figure, a lens 20*a* for the flat light distribution emitting and forming the flat light distribution 42 by entering the light transmitted through this optical fiber 30*a*, an optical fiber 30*b* emitting a light by entering the light generated by a light source not shown in the figure, and the lens 10*e* for the hot zone light distribution in the shape of a substantially one half (½) of a cone emitting and forming a hot zone light distribution by entering the light emitted by this optical fiber 30*b*. In addition, FIG. 11(*b*) shows a light distribution 40*c* formed by light irradiated by the lens 20*a* for the flat light distribution and the lens for the hot zone light distribution 10*e*.

A vertical cross-section (z–y plane) of an exit surface 12*e* of the lens 10*e* for the hot zone light distribution of the present fourth embodiment has a focal point in the vicinity of an incident surface lie and the lens surface has a radius of curvature to be substantially zero aberration. Furthermore, as for the lens surface, a radius of curvature of the horizontal cross-section (z–x plane) of the exit surface 12*e* of the lens 10*e* for the hot zone light distribution is made smaller than a radius of curvature of the vertical cross-section (z–y plane). That is, the aberration of the horizontal cross-section (z–x plane) is formed larger than the aberration of the vertical cross-section (z–y plane). Moreover, at the side surface, a side total reflective surface 13*e* forming an inclined surface inclining clockwise by 7.5° with respect to the vertical surface along the irradiating direction is formed. Accordingly, a light emitted from the exit surface 12*e* of the lens 10*e* for the hot zone light distribution can form a hot zone light distribution 70 enabling to illuminate an upper left place in a distant area without causing glaring against the oncoming vehicles running in the opposite lane.

A hot zone light distribution 70 shown in FIG. 11(*b*) has an area 70*a* formed by direct light emitted from a direct exit surface 12*e* without reflecting on the side total reflective surface 13*e*, an area $70a_z$ where the periphery of the area 70*a* disperses blurredly due to the aberration, an area 70*b* formed by light emitted from the exit surface 12*e* after reflecting on the side total reflective surface 13*e*, and an area $70b_z$ where the periphery of the area 70*b* disperses blurredly due to the aberration.

In the present fourth embodiment constructed as above, because the aberration of the horizontal cross-section (x-axis direction) is formed larger than the aberration of the vertical cross-section (y-axis direction), light emitted from the exit surface 12*e* of the lens 10*e* for the hot zone light distribution disperses in the right and left direction, and also can form the hot zone light distribution 70 enabling it to illuminate a far distant area without causing glaring against the on-coming vehicles running in the opposite lane.

Besides, in the fourth embodiment, although an explanation has been made based on an example where the lens 20*a* for the flat light distribution is disposed at the left side of the light-axis direction (z-axis direction) and the lens 10*e* for the hot zone light distribution in the shape of a substantially one half (½) of a cone is disposed at the left side of the light-axis direction (z-axis direction), the right and left positions of these lens 20*a* for the flat light distribution and the lens 10*e* for the hot zone light distribution can be reversely disposed.

In the fourth embodiment, the side surface forms the side total reflective surface 13*e* forming an inclined surface inclining clockwise by 7.5° with respect to the vertical surface along the irradiating direction, however, as for a vehicle running in the right lane, the side surface forms the side total reflective surface forming an inclined surface inclining counterclockwise by 7.5° with respect to the vertical surface along the irradiating direction.

The present invention is not limited to the foregoing embodiments but may be modified in many other ways without departing from the spirit of the invention.

What is claimed is:

1. An illuminating device for a vehicle comprising:

an optical fiber for providing light;

a cone-type lens for light distribution having an incident surface and an exit surface, the incident surface being smaller than the exit surface and disposed to receive the light from the optical fiber, the exit surface being an aspheric lens surface defined by horizontal and vertical outer peripheries having different radii of curvature so that an aberration in a horizontal direction can be larger than an aberration in a vertical direction of the exit surface, wherein outgoing light emitted from said exit surface has a distribution in which a peripheral portion in a horizontal direction is blurrier than a peripheral portion in a vertical direction.

2. An illuminating device for a vehicle as set forth in claim 1, wherein:

a radius of curvature of said horizontal outer periphery of the aspheric lens surface is smaller than a radius of curvature of said vertical outer periphery.

3. An illuminating device for a vehicle comprising:

an optical fiber for providing light;

a lens for light distribution having an incident surface and an exit surface, the incident surface being smaller than the exit surface and disposed to receive the light from the optical fiber, the exit surface being an aspheric lens surface defined by horizontal and vertical outer peripheries having different radii of curvature so that an aberration in a horizontal direction can be larger than an aberration in a vertical direction of the exit surface, wherein outgoing light emitted from said exit surface has a distribution in which a peripheral portion in a horizontal direction is blurrier than a peripheral portion in a vertical direction, a radius of curvature of said horizontal outer periphery of the aspheric lens surface is smaller than a radius of curvature of said vertical outer periphery, the aspheric lens surface is made of a curved surface formed by combining ellipsoids, said vertical outer periphery of the lens surface is an ellipsoid expressed by $y^2/b_0^2+(z+a)^2/a^2=1$, and said horizontal outer periphery of the lens surface is an ellipsoid expressed by $x^2/b_1^2+(z+a)^2/a^2=1$, and the aspheric lens surface is so formed as to make a shorter diameter $b_0$ of the vertical outer peripheral ellipsoid larger than a shorter diameter $b_1$ of the horizontal outer peripheral ellipsoid ($b_0>b_1$), with a z-axis representing a light-axis, an x-axis representing a horizontal-axis and a y-axis representing a vertical-axis, and (a) representing a longer diameter of the vertical outer peripheral ellipsoid or a longer diameter of the horizontal outer peripheral ellipsoid.

4. An illuminating device for a vehicle as set forth in claim 3, wherein:

$b_2$ is designed to linearly decrease from $b_0$ to $b_1$ as θ goes from 0 degree to 90 degree in a case in which a longer diameter of an outer peripheral ellipsoid of a cross-section inclining by θ degrees from the y-axis is (a), and a shorter diameter is $b_2$ while having a relation of $b_0>b_2>b_1$.

5. An illuminating device for a vehicle as set forth in claim 3, wherein:

$b_2$ is designed to non-linearly decrease form $b_0$ to $b_1$ as θ goes from 0 degree to 90 degrees in a case in which a longer diameter of an outer peripheral ellipsoid of a cross-section inclined by 0 degrees from the y-axis is (a), and a shorter diameter is $b_2$ while having a relation to $b_0>b_2>b_1$.

6. An illuminating device for a vehicle as set forth in claim 5, wherein:

θ is substantially equal to $b_0$ when θ is goes from 0 to 90 degrees, and θ is designed to be abruptly changed to $b_1$ when θ is near 90 degrees, in a case in which the longer diameter of the outer peripheral ellipsoid of the cross-section inclining by θ degrees from the y-axis is and the shorter diameter is $b_2$ while having a relation to $b_0>b_2>b_1$.

7. An illuminating device for a vehicle comprising:

an optical fiber for providing light;

a lens for light distribution having an incident surface and an exit surface, the incident surface being smaller than the exit surface and disposed to receive the light from the optical fiber, the exit surface being an aspheric lens surface defined by horizontal and vertical outer peripheries having different radii of curvature so that an aberration in a horizontal direction can be larger than an aberration in a vertical direction of the exit surface, wherein outgoing light emitted from said exit surface has a distribution in which a peripheral portion in a horizontal direction is blurrier than a peripheral portion in a vertical direction, the lens for light distribution has a totally reflecting surface inclined by a predetermined angle with respect to a vertical surface of a light-axis; and a light distribution formed by outgoing light emitted form the exit surface is located slantingly in a vertical direction of the light-axis based on reflection by the totally reflecting surface.

8. An illuminating device for a vehicle as set forth in claim 7, wherein:

the light distribution located slantingly in the vertical direction of the light-axis has an upper edge increasing its height toward an outside direction, and an inclining angle of the totally reflecting surface is approximately half of an inclining angle with respect to a horizontal surface of an upper edge.

9. An illuminating device for a vehicle as set forth in claim 7, wherein:

the totally reflecting surface is formed to stray off a light axis direction gradually as it goes closer to the exit surface, and the inclining angle is formed to be gradually smaller as it goes closer to the exit surface.

10. An illuminating device for a vehicle as set forth in claim 7, wherein:

the totally reflecting surface is formed at a left side with respect to the light-axis in the case of a vehicle running in a left lane and formed at a right side with respect to the light-axis in a case of a vehicle running in a right lane.

11. A lens body for a vehicle head light for projecting light incident from a predetermined position forwardly, the lens body comprising:

a flat surface provided near the predetermined position;

a curved surface provided to face the flat surface and defined to have first and second focal points with respect to first and second orthogonal axes, the curved surface having a larger surface area than the flat surface to provide a generally cone shape;

the first focal point being located substantially at the predetermined position; and the second focal point being deviated from the predetermined position, whereby a first outer edge of the projected light with respect to the first orthogonal axis is formed more clearly than a second edge of the projected light with respect to the second orthogonal axis, the projected light resulting from light incident on the flat surface and projected from the curved surface.

12. A lens body as set forth in claim 11, wherein:

the first orthogonal axis extends vertically and the second orthogonal axis extends horizontally; and the first outer edge corresponds to a boundary of the projected light in a vertical direction and the second outer edge corresponds to a boundary of the projected light in a horizontal direction.

13. A lens body as set forth in claim 11, further comprising:

a light source for providing the light at the predetermined position; and a defining member located forward of the light source to define a pattern of light projected from the lens surface.

14. A lens body for a vehicle head light for projecting light incident from a predetermined position forwardly, the lens body comprising:

a flat surface provided near the predetermined position;

a curved surface provided to face the flat surface and defined to have first and second focal points with respect to first and second orthogonal axes;

the first focal point being located substantially at the predetermined position; and the second focal point being deviated from the predetermined position, whereby a first outer edge of the projected light with respect to the first orthogonal axis is formed more clearly than a second edge of the projected light with respect to the second orthogonal axis, the projected light resulting from light incident on the flat surface and projected from the curved surface, a reflection surface is provided to extend along the second axis, and the second edge of the projected light is defined by reflection of light by the reflection surface.

15. A lens body as set forth in claim 14, wherein:

the reflection surface extends horizontally; and the second edge includes an upper edge and a lower edge, one of which is defined by the reflection of light by the reflection surface.

16. A lens body as set forth in claim 11, wherein:

the second surface is curved continuously in three dimensions.

17. An illuminating device for a vehicle comprising:

an optical fiber for providing light;

a lens body having a flat surface for receiving the light and a curved surface defined by a horizontal curved line and a vertical curved line, radii of curvature of said horizontal curved line and said vertical curved line are different from each other, the lens body passing the light therefrom from the flat surface to the curved surface to project the light forward to illuminate a predetermined area which covers an on-coming vehicle side; and the curved surface defines horizontal side edges in a vertical direction having an upper side edge of the projected light at the on-coming vehicle side more clearly defined than the horizontal side edges.

18. An illuminating device as set forth in claim 17, wherein:

the curved surface defines a lower side edge of the projected light less clearly than the upper side edge by light passing along a light path different from a light path along which the light for defining the upper side edge passes.

19. An illuminating device for a vehicle as set forth in claim 1, wherein:

the cone-type lens is a partial cone shape and has a flat surface extending vertically to totally reflect the light thereby.

20. An illuminating device for a vehicle as set forth in claim 19, wherein:

the cone-type lens has a half cone shape.

21. An illuminating device for a vehicle as set forth in claim 19, wherein:

the cone-type lens has a quarter cone shape.

* * * * *